United States Patent
Boldy

(10) Patent No.: US 6,947,030 B1
(45) Date of Patent: Sep. 20, 2005

(54) ACTUATING DEVICE FOR MINIATURE KEYBOARDS

(75) Inventor: Manfred Boldy, Horb a. N. (DE)

(73) Assignee: International Business Machines Corporation, Armonk, NY (US)

(*) Notice: Subject to any disclaimer, the term of this patent is extended or adjusted under 35 U.S.C. 154(b) by 565 days.

(21) Appl. No.: 09/724,040

(22) Filed: Nov. 28, 2000

(30) Foreign Application Priority Data

Nov. 30, 1999 (DE) .............................. 199 57 631

(51) Int. Cl.[7] .............................................. G09G 5/00
(52) U.S. Cl. ...................... 345/168; 345/157; 345/169; 341/22; 341/23
(58) Field of Search .................... 345/168, 170, 345/172, 177, 961, 970, 169, 157; 361/680, 361/686; 340/825.7, 825.71, 825.72; 338/114; 200/6 R; 341/22, 23

(56) References Cited

U.S. PATENT DOCUMENTS

| | | | | |
|---|---|---|---|---|
| 3,787,898 A | * | 1/1974 | Walker ........................... 2/163 |
| 4,449,024 A | * | 5/1984 | Stracener ..................... 200/310 |
| 5,025,705 A | * | 6/1991 | Raskin .......................... 84/743 |
| 5,107,739 A | * | 4/1992 | Muramatsu et al. ........... 84/20 |
| 5,219,067 A | * | 6/1993 | Lima et al. ............... 200/302.2 |
| 5,261,393 A | * | 11/1993 | Weinzweig ................... 601/40 |
| 5,280,145 A | * | 1/1994 | Mosier et al. .............. 200/313 |
| 5,399,823 A | * | 3/1995 | McCusker ................... 200/521 |
| 5,428,355 A | * | 6/1995 | Jondrow et al. .............. 341/20 |
| 5,473,325 A | * | 12/1995 | McAlindon ................... 200/6 A |
| 5,529,415 A | * | 6/1996 | Bishop .......................... 401/7 |
| 5,973,621 A | * | 10/1999 | Levy ............................ 341/22 |
| 6,170,123 B1 | * | 1/2001 | Holland-Letz ............... 16/436 |
| 6,232,960 B1 | * | 5/2001 | Goldman .................... 345/168 |
| 6,377,685 B1 | * | 4/2002 | Krishnan ............... 379/433.07 |
| 6,454,808 B1 | * | 9/2002 | Masada .................... 623/21.15 |

* cited by examiner

*Primary Examiner*—Xiao Wu
*Assistant Examiner*—Abbas Abdulselam
(74) *Attorney, Agent, or Firm*—John Bruce Schelkopf; Daniel E. McConnell; Dillon & Yudell LLP

(57) ABSTRACT

The invention concerns a simple and user-friendly actuating device (10) for miniature keyboards or miniature input tablets. The device has of a dome-shaped body (12) which is adapted to the curve of the fingertip and fitted to the fingertip by means of a removable adhesive bond. The dome-shaped body has a pin-shaped projection (14) on its convex side which serves as the actuating element. The dome-shaped body is made of a soft plastic material which molds to the fingertip. On the concave side of the dome is an adhesive layer (18) which permits repeated fitting and removal of the dome to and from the fingertip.

9 Claims, 3 Drawing Sheets

ACTUATING DEVICE FOR MINIATURE KEYBOARDS

BACKGROUND OF THE INVENTION

1. Technical Field

The invention concerns an actuating device for miniature keyboards or input tablets with an actuating element which is shaped in the form of a pen and has a tip adapted to the size of the keys or tablet fields, in particular for use with palmtop computers.

2. Description of the Related Art

Miniaturized electronic devices such as palmtop computers, input tablets, watches, medical equipment and suchlike have miniature keys or input panels which, as a result of the mismatch in size between the touch area and the width of the finger, are in some cases difficult to operate. In order to enable safe actuation of miniature keyboards, specially adapted pens are used. The actuation of keys with pens of this kind is, however, awkward and time-consuming.

A miniaturized interface device wearable on the finger to generate a digital input into information processing devices is also known (U.S. Pat. No. 4,954,817). The device has a finger palette and a stylus ring which are worn on various fingers and which in their interaction perform the function of a digital input tablet and a conventional mouse input device. For this, the finger palette is worn on the index finger and the stylus ring on the thumb of the same hand. When the two fingers are brought together the stylus ring can be used to select a specific coordinate on the finger palette and generate a corresponding input into a connected computer, while the fingertips remain free for simultaneous operation of a keyboard. The operation of miniaturized keyboards plays no role in this known device.

SUMMARY OF THE INVENTION

An object of the invention is to provide a simple and user-friendly actuating device for miniature keyboards or miniature input tablets.

A further object of the invention is to provide an actuating device for miniature keyboards or miniature input tablets which is worn on the finger, which is light in weight, and which does not place a strain on the fingers and hand and does not impede the movement of the fingers.

A further object of the invention is to provide an actuating device for miniature keyboards or miniature input tablets which is worn on the finger and which permits quick and uncomplicated fitting on and removal from the finger.

In accordance with the invention as defined in the claims, a dome-shaped body is adapted to the curve of the fingertip and fitted to the fingertip by means of a removable adhesive bond. The dome-shaped body has a pin-shaped projection on its convex side which serves as the actuating element. The dome-shaped body is made of a soft plastic material which molds to the fingertip. On the concave side of the dome is an adhesive layer which permits repeated fitting and removal of the dome to and from the fingertip.

The device in accordance with the invention is suitable for actuation of miniaturized keyboards and for data input on miniaturized input tablets. It also permits combined use to operate a normal keyboard and a miniaturized input tablet or, conversely, a miniaturized keyboard and a normal-sized input tablet. This is possible because the dome barely impedes the movement of the fingers, and keys or input tablets of normal size can be operated even with the dome fitted.

BRIEF DESCRIPTION OF THE DRAWINGS

Various embodiments of the invention are described in the following on the basis of drawings.

DETAILED DESCRIPTION OF THE PREFERRED EMBODIMENT

Figure 1:
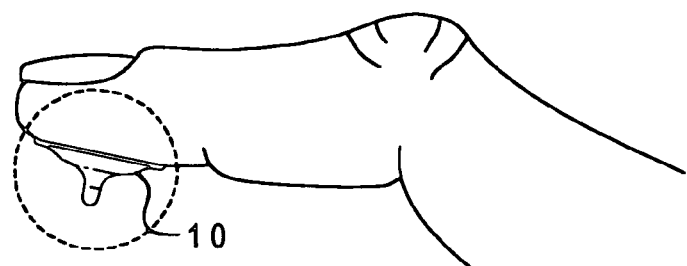
FIG. 1 shows a schematic view of a human finger fitted with the actuating device in accordance with the invention.
Figure 2:
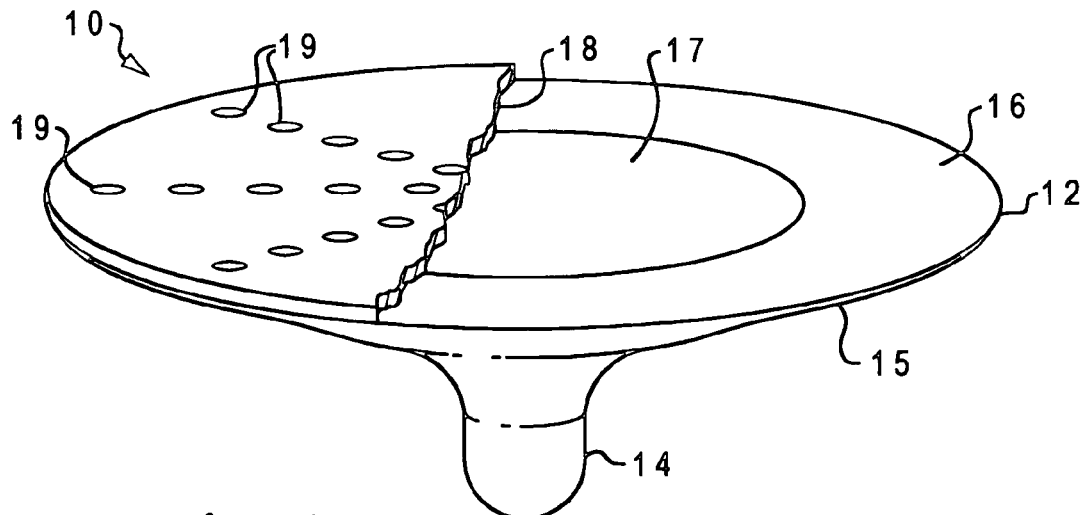
FIG. 2 shows a perspective of a first embodiment of the device in accordance with the invention.
Figure 3:
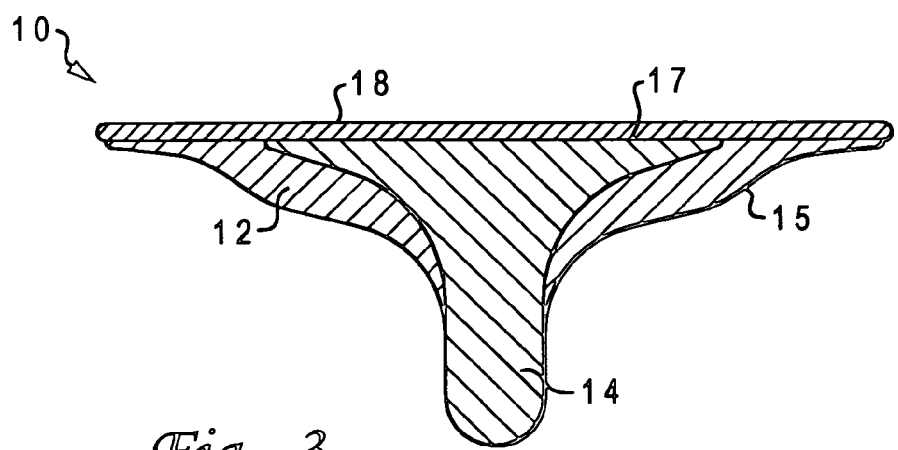
FIG. 3 shows a section through the device as shown in FIG. 2.

FIG. 1 shows a schematic view of a human finger with an actuating device 10 fitted to the fingertip. The embodiment of the actuating device 10 in accordance with the invention presented in FIGS. 2 and 3 comprises a dome 12, a pin 14 and the convex outer side 15 of the dome 12 and a thin layer 18 applied to the concave inside 16 of the dome 12, said thin layer having an adhesive coating. The dome 12 is preferentially circular around its circumference and is made of a soft plastic material such as polyethylene or PVC, which adapts itself to the shape of the fingertip. The pin 14 is rotationally symmetric and is manufactured as a separate part. It is made of a harder plastic, which may likewise be polyethylene or PVC. The pin 14 is widened at its base and is inserted into an opening in the dome 12 and permanently joined to it, wherein its base surface 17 is adapted to the concave surface 16 of the dome 12 and forms one surface with it. In this position the pin 14 is permanently joined to the dome 12 and the layer 18.

The dome 12 is made of a fine-pored synthetic foam, such as Styrofoam from Dow Chemical, or any standard commercially available mousse foam. The layer 18 is an adhesive bonded layer. A standard commercially available adhesive which permits repeated removal and refitting in the manner of a sticking plaster is suitable as the bonding agent. The layer 18 also has a large number of small perforations 19 which serve to absorb deposits of perspiration on the fingertip.

For use, the dome 12 is fitted on the finger and pressed on, and adheres to the fingertip by means of the adhesive layer. For one-handed operation of miniature electronic devices such as palmtop computers or mobile phones, the dome 12 is preferentially fitted on the thumb, since the thumb is able to cover a wide range of movement and permits positioning of the pin 14 on the keys of the device. The free end of the pin 14 is adapted to the shape of the keys being pressed, and may be pointed or rounded or have a small flattening on its tip. On every press of a key the dome 12 is pressed back onto the tip of the thumb, so that a safe fitting of the dome on the finger is ensured. The dome 12 may instead also be fitted on the tip of the index finger in order to enable two-handed operation or to operate miniaturized input tablets. A number of domes 12 can also be fitted simultaneously on several fingers. Since the domes are small in area, mutual impeding of the fingers as a result of the fitted domes is largely avoided.

FIGS. 4–7 show further embodiments of the invention. In the embodiment of the invention as presented in FIGS. 4 and 5, a dome 20 and a pin 22 are formed as one combined part made of a plastic material such as polyethylene or PVC. The hardness of this material is chosen such that it molds to the shape of the fingertip but is still hard enough for the pin 22 to perform its function as an actuating element. The dome 20 is preferentially manufactured as a rotationally symmetric molding and on its inside facing the finger forms a bell-shaped cavity 24. The pin 22 has at its base a funnel-shaped extension 25 which ends at the rim 21 of the dome and forms a further cavity 26. In the area of the rim 21 of the dome a ring-shaped layer 28 is affixed, corresponding to the layer 18 in FIGS. 2 and 3. The layer comprises a fine-pored synthetic foam and bears an adhesive coating which permits repeated removal and rebonding.

When the dome 20 is fitted on the fingertip a vacuum is created in the cavities 24 and 26 which generates a suction effect in the two cavities 24 and 26. This supports the adhesive power of the adhesive layer 28 and additionally stabilizes the pin 22 when the device is in use, thereby assisting the safe fitting of the dome 20 on the finger. The embodiment of the invention as shown in FIGS. 4 and 5 is characterized in particular by its light weight.

Figure 4:
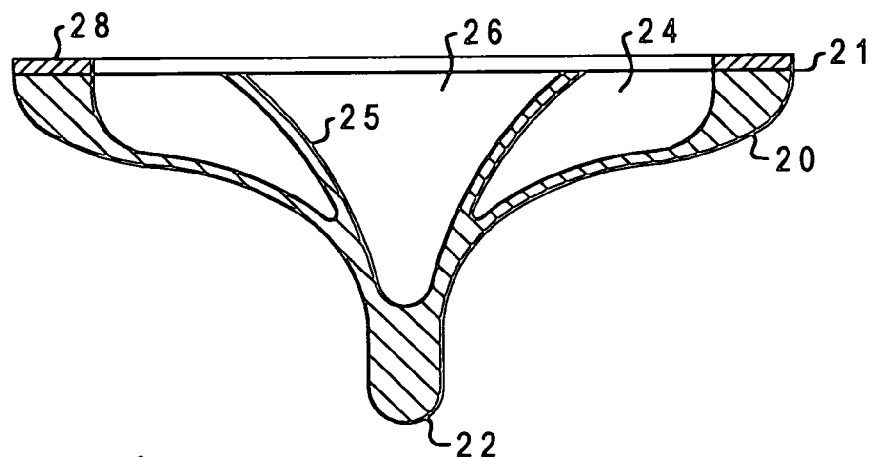
FIG. 4 shows a section through a further embodiment of the device in accordance with the invention.
Figure 5:
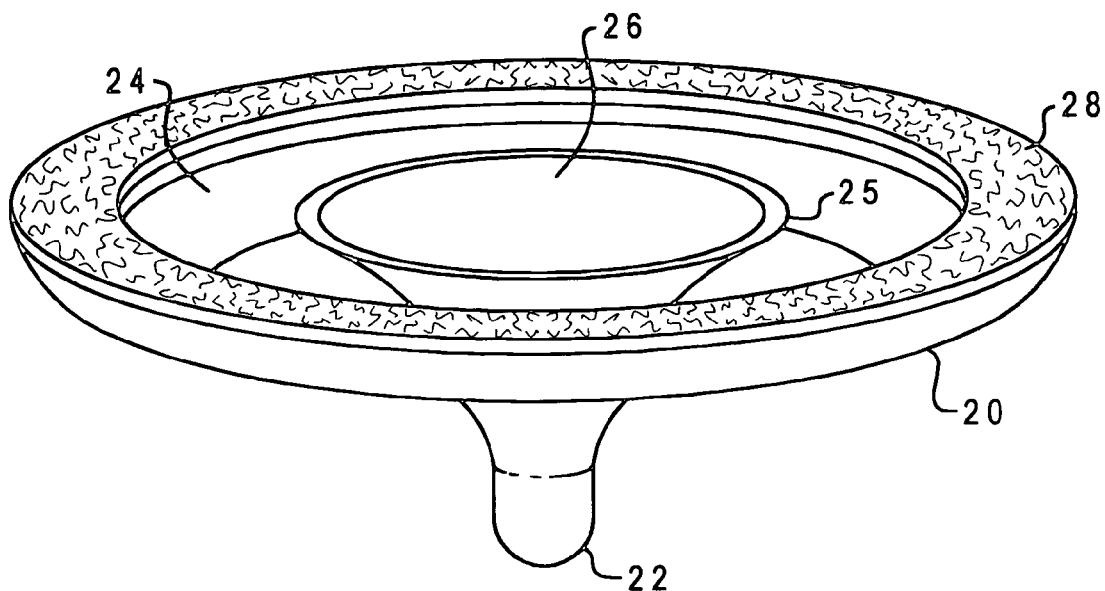
FIG. 5 shows a perspective of the device as shown in FIG. 4.
Figure 6:
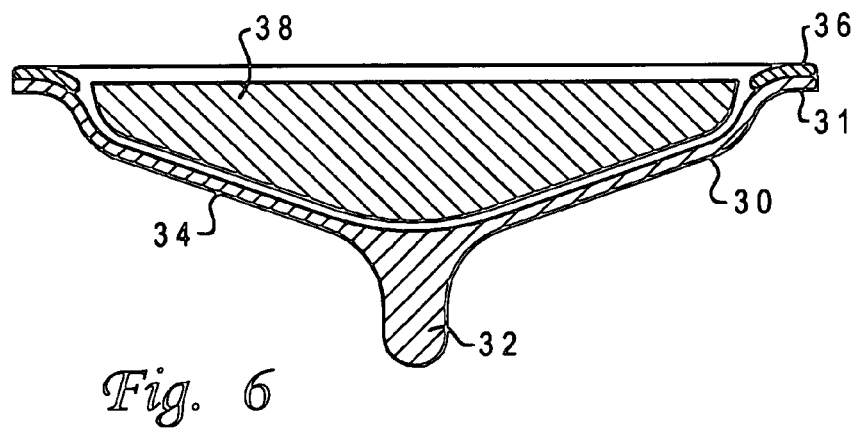
FIG. 6 shows a section through a third embodiment of the device in accordance with the invention.
Figure 7:
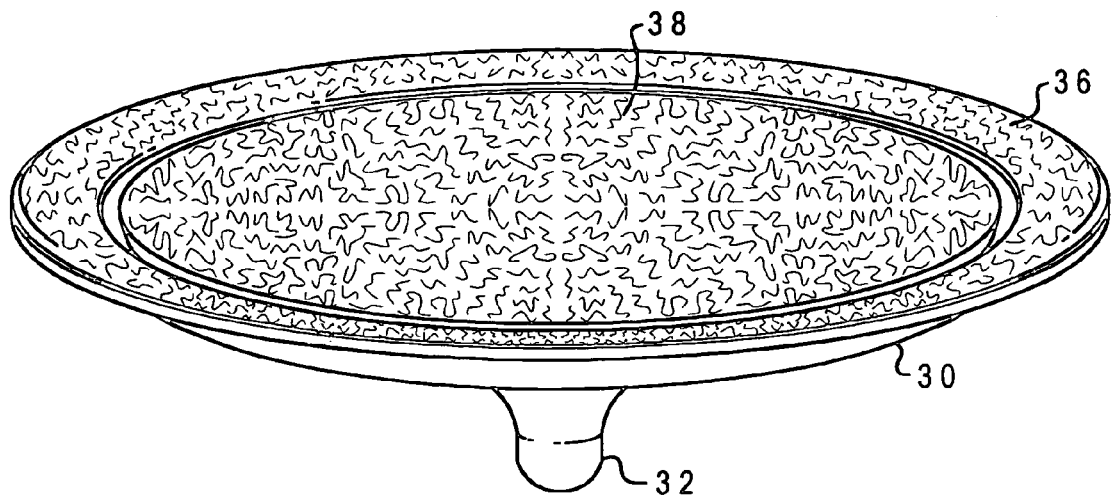
FIG. 7 shows a perspective of the device as shown in FIG. 6.

In the embodiment of the invention as shown in FIGS. 6 and 7, a dome 30 and a pin 32 are formed as a single part made of a plastic material, such as polyethylene or PVC, as in the embodiment of the invention shown in FIGS. 4 and 5. The dome 30 is manufactured as a rotationally symmetric molding, shaped like a bell with a relatively thin wall 34. In the central part of the dome 30 the wall 34 merges into the pin 32. In the area of the rim 31 of the dome a ring-shaped layer 36 is affixed, corresponding to the layer 28 in FIGS. 4 and 5. The layer is formed as an adhesive bonding layer and permits repeated removal and rebonding. On the concave side of the dome 30 is a lenticular felt inlay 38 which fills out the interior of the bell and stabilizes the dome 30 and the position of the pin 32.

When the dome 30 is fitted on the fingertip the adhesive layer 28 bonds to the finger. By pressing the dome 30 onto the finger the felt inlay 38 is compressed to a certain extent, thereby creating a vacuum in the area surrounding the felt inlay 38 which generates a suction force which in turn assists the adhesive power.

The invention has been described on the basis of embodiments of the invention. Derivations of the embodiments shown and described, or other embodiments of the invention, lie within the framework of the following claims.

What is claimed is:

1. A device for actuating small keys on miniature keyboards, input tablets, and the like, comprising:
   a dome having an axis, a base surface, an axial opening located opposite the base surface, an axial cavity that tapers down from the base surface to the axial opening, an axial dimension measured from the base surface to the axial opening, and a profile that is rotationally symmetric about the axis, the dome being formed from a soft plastic material such that the dome is adaptable to a fingertip, wherein the base surfaces of the dome and the pin are co-planar to define a single contact surface for contacting the device with the fingertip;
   a pin having an axis, a base surface, and a tip, the pin being located in and coaxial with the axial cavity of the dome, and the pin extending from the base surface of the dome through the axial opening of the dome such that the pin has an axial dimension that is greater than the axial dimension of the dome, and the tip of the pin extends axially beyond the axial opening of the dome; and
   an adhesive layer joined to the base surface of the dome for adhering and securing the dome to the fingertip, the adhesive layer permitting repeated removal and rebonding with respect to the fingertip.

2. The device of claim 1, wherein the adhesive layer is circular and covers the entire base surfaces of both the dome and the pin, and wherein the adhesive layer is perforated for absorbing deposits of perspiration on the fingertip.

3. The device of claim 1, wherein the pin is formed from a material that is harder than the soft plastic material of the dome such that the pin is resilient for actuating keys, and wherein the dome is pressed back onto the fingertip during operation.

4. The device of claim 1, wherein the pin has an exterior profile that is contoured to a shape of the axial cavity of the dome.

5. A device for actuating small keys on miniature keyboards, input tablets, and the like, comprising:
   a dome having an axis, a perimeter, a base surface extending around the perimeter, a tip located opposite the base surface, an outer wall, an inner wall, an outer cavity located between the outer and inner walls adjacent to the perimeter, an inner cavity located radially inward of the inner wall relative to the axis, the inner cavity having an axial dimension that is greater than an axial dimension of the outer cavity, the entire dome being formed from a single material such that the dome molds to a fingertip but is hard enough for the tip to actuate keys, and each of the inner and outer cavities forming a vacuum between the dome and the fingertip, wherein each of the perimeter, the base surface, the tip, the outer wall, the inner wall, the outer cavity, and the inner cavity are rotationally symmetric about the axis, and further wherein the base surface and a portion of the inner wall are co-planar for contacting the fingertip; and
   an adhesive layer joined to the base surface of the dome for adhering the dome, along with the vacuums formed by the inner and outer cavities, to the fingertip, the adhesive layer permitting repeated removal and rebonding with respect to the fingertip.

6. The device of claim 5, wherein the adhesive layer is circular and covers only the base surface of the dome, such that the inner cavity, the inner wall, and the outer cavity are exposed for direct contact with the fingertip.

7. A device for actuating small keys on miniature keyboards, input tablets, and the like, comprising:
   a dome having an axis, a perimeter, an annular base surface located adjacent to the perimeter, a tip located opposite the base surface, a convex exterior, an axial cavity that is concave in shape and tapers down from the base surface toward the tip, the axial cavity having an axial dimension that is less than an axial dimension measured from the base surface to the tip, and a profile that is rotationally symmetric about the axis, the dome being formed from a material that is adaptable to a fingertip, wherein the base surfaces of the dome and the inlay are co-planar to define a single surface for contact with the fingertip;
   an inlay located in and coaxial with the axial cavity, the inlay having an axis, and a base surface, the inlay extending from the base surface of the dome and filling the entire axial cavity of the dome, such that the inlay has an axial dimension that is less than the axial dimension measured from the base surface of the dome to the tip of the dome, the inlay being compressible such that a vacuum is formed between the dome and the fingertip; and an adhesive layer joined to the base surface of the dome for adhering and, along with the vacuum formed by the inlay, securing the dome to the fingertip, the adhesive layer permitting repeated removal and rebonding with respect to the fingertip; wherein the adhesive layer is circular and covers only the base surface of the dome, such that the base surface of the inlay is exposed for direct contact with the fingertip.

8. The device of claim 7, wherein the inlay is lenticular in shape and formed from a felt.

9. The device of claim 7, wherein the inlay has an exterior profile that is contoured to a shape of the axial cavity of the dome.

\* \* \* \* \*